No. 859,367. PATENTED JULY 9, 1907.
F. W. COHN.
ELECTRICAL PUSH BUTTON.
APPLICATION FILED MAR. 5, 1907.

Witnesses

Inventor
Frederick W. Cohn
By 
His Attorney

UNITED STATES PATENT OFFICE.

FREDERICK W. COHN, OF NEW YORK, N. Y.

ELECTRICAL PUSH-BUTTON.

No. 859,367.   Specification of Letters Patent.   Patented July 9, 1907.

Application filed March 5, 1907. Serial No. 360,721.

*To all whom it may concern:*

Be it known that I, FREDERICK W. COHN, a citizen of the United States, residing at New York, county of New York, and State of New York, have invented certain new and useful Improvements in Electrical Push-Buttons, of which the following is a specification.

My invention relates to electrical push-buttons, particularly those known as "midget" push-buttons.

"Midget" push-buttons are those small electrical push-buttons which are intended to be sunk in the object to which they are attached and to be more or less inconspicuous.

In "midget" push-buttons heretofore generally employed, there has been more or less electrical and mechanical weakness for a variety of reasons, among which may be mentioned that the small coil springs which are usually employed to return the push-button or finger-piece to normal position become weak and do not properly respond and permit short-circuiting of the contacts; the insulated circuit wires are more or less exposed at the rear of the back plate of the button, tending to induce short-circuiting; screws are employed for attaching the circuit wires to the contacts which also loosen and tend to cause short-circuiting; and this class of push-buttons are more or less troublesome to install.

The objects of my present invention are to overcome the defects heretofore incident to "midget" push-buttons and to provide a push-button of this class which will be extremely simple, strong and durable, can be manufactured inexpensively and be made very small without impairing its usefulness; will be easy to install, and in which binding-screws for the wires will be eliminated, the old form of coil-spring done away with, and novel features provided which insure reliability of operation at all times.

In carrying out the invention, I provide a novel form of spring, associated with novel fastening means for the wire terminals, novel means for preventing outer exposure of bare parts of the wire, and provide an improved shell, as well as other details of construction, all of which are fully set forth hereinafter and recited in the appended claims.

Figure 1:
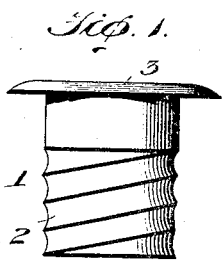
Figure 3:
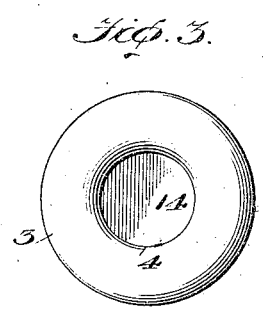
Figure 2:
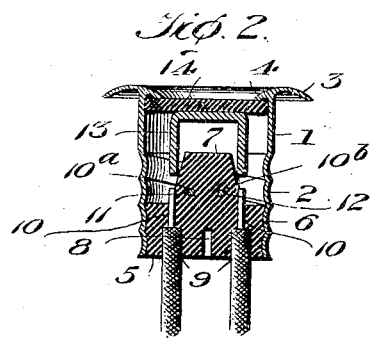
Figure 4:
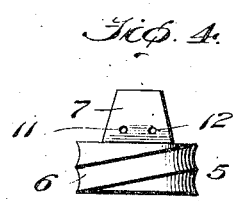
Figure 5:
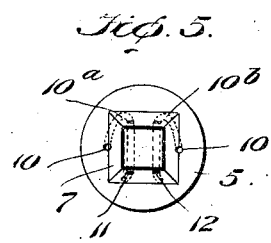
Figure 6:
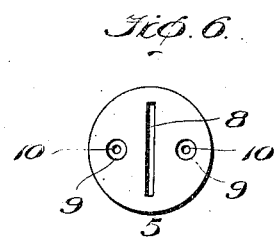
Figure 7:
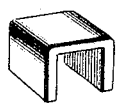
Figure 7:
Figure 7:

In the accompanying drawings: Figure 1 is a side elevation; Fig. 2, a vertical section, showing the wire terminals; Fig. 3, a plan view of Fig. 2; Fig. 4, a detail side elevation of the back-piece; Fig. 5, a plan view thereof; Fig. 6, a bottom view thereof; and Fig. 7, a detail perspective of the spring.

The containing shell or case 1 is of metal, such as polished brass, and provided with corrugated screw-threads 2 on its body, while its mouth is equipped with an integral rim or flange 3 which extends inwardly as well as outwardly and provides a retaining bead 4. The exterior conformation of the screw threads assists in holding the shell in the hole in which it is inserted when installed.

The numeral 5 designates the back-piece which is of glazed porcelain and of circular shape with screw-threads 6 corresponding to the threads 2 so that this back-piece is adapted to screw into the end of the shell 1. One face of the back-piece is provided with an integral part 7 in the form of a truncated square pyramid which serves as a spreader for the movable contact.

In the rear or bottom of the back-piece 5 is a slit 8 to receive a screw-driver to screw the back-piece into the shell 1 or unscrew it. The back-piece has wire-receiving holes 9 which, for a certain distance, are sufficiently large to accommodate the insulation of the wire and then they continue of smaller size at 10 and open out at opposite sides of the spreader 7, these holes being of the proper size to accommodate the bare wire only.

Extending transversely through the lower portion of the spreader 7, are apertures 11 and 12, the former being intended for the reception of the terminal wire 10$^a$ and the latter for the reception of the terminal wire 10$^b$ whose ends are bent down, as shown.

The numeral 13 represents a U-shaped piece of metal of suitable thickness, having inherent resiliency and being of approximately the width of the base of the spreader 7 and straddling said spreader so that the legs of this spring are in a position to be pressed against the terminals 10$^a$ and 10$^b$ when said spring is pressed inwardly.

At 14 there is shown a circular disk of insulating material, such as celluloid, pearl or rubber, which lies against the bridge of the spring 13 and is of sufficient diameter to move easily within the shell 1 and be retained, against outward displacement, by the flange or bead 4. Normally the resiliency of the spring 13 causes the said spring to be displaced toward the outer end of shell 1 so that the legs of the spring are out of contact with the terminals 10$^a$ and 10$^b$. When the disk or push-button 14 is pressed upon, the legs of spring 13 are spread, against the resilient tendency of said legs to maintain their normal positions, by contact with the pyramidal part or spreader 7, the legs sliding against said part and coming into good rubbing contact with the terminals 10$^a$ and 10$^b$, completing the circuit. Upon the release of the push-button 14, the resiliency of the spring 13 causes it to resume its normal position and the circuit is broken.

Having thus described my invention, what I claim as new and desire to secure by Letters Patent, is:—

1. In an electrical push-button, the combination with a shell having a screw-threaded part on both its interior and exterior, of a base or back-piece having a screw-threaded part to engage the interior screw threads of the shell the exterior screw threads being exposed, electrical contacts within the shell, and a push-button for causing engagement of said contacts.

2. In an electrical push-button, the combination with a spreader and means for holding the wire terminals, of an expansible and contractible contact adapted to be pressed over the spreader to complete the circuit, said contact being adapted to automatically retract itself when released and break the circuit.

3. In an electrical push-button, the combination with a spreader and means for holding the wire terminals, of a substantially U-shaped expansible and contractible contact adapted to be pressed over the spreader to complete the circuit, said contact being adapted to automatically retract itself when released and break the circuit.

4. In an electrical push-button, the combination with a spreader of general pyramidal form and means for holding the wire terminals, of a substantially U-shaped expansible and contractible contact adapted to be pressed over the spreader to complete the circuit, said contact being adapted to automatically retract itself when released and break the circuit.

5. In an electrical push-button, the combination with a spreader having openings to receive the wire terminals, of an expansible and contractible contact adapted to be pressed over the spreader to complete the circuit, said contact being adapted to automatically retract itself when released and break the circuit.

6. In an electrical push-button, the combination with a shell or case, of a back-piece associated therewith having on its inner face a tapering spreader provided with wire-receiving openings, said back-piece having apertures for the passage of the wire terminals, and an expansible and contractible contact movable in the shell and adapted to be pressed over the spreader to complete the circuit, said contact being adapted to automatically retract itself when released and break the circuit when released.

In testimony whereof, I hereunto affix my signature in presence of two witnesses.

FREDERICK W. COHN.

Witnesses:
M. F. FREIDEURICH,
J. G. WELSH.